(12) United States Patent
Lee

(10) Patent No.: US 11,916,290 B2
(45) Date of Patent: Feb. 27, 2024

(54) STRUCTURE FOR REDUCING INTERFERENCE BETWEEN ANTENNAS AND ELECTRONIC DEVICE COMPRISING THE SAME

(71) Applicant: Samsung Electronics Co., Ltd., Gyeonggi-do (KR)

(72) Inventor: Minju Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 839 days.

(21) Appl. No.: 16/971,912

(22) PCT Filed: Jul. 29, 2020

(86) PCT No.: PCT/KR2020/009965
§ 371 (c)(1),
(2) Date: Aug. 21, 2020

(87) PCT Pub. No.: WO2021/049759
PCT Pub. Date: Mar. 18, 2021

(65) Prior Publication Data
US 2023/0155280 A1 May 18, 2023

(30) Foreign Application Priority Data
Sep. 9, 2019 (KR) .................. 10-2019-0111338

(51) Int. Cl.
*H01Q 1/52* (2006.01)
*H01Q 5/30* (2015.01)
(Continued)

(52) U.S. Cl.
CPC .............. *H01Q 1/523* (2013.01); *H01Q 1/243* (2013.01); *H01Q 1/38* (2013.01); *H01Q 1/48* (2013.01); *H01Q 5/30* (2015.01); *H01Q 21/28* (2013.01)

(58) Field of Classification Search
CPC .......... H01Q 1/523; H01Q 1/243; H01Q 1/38; H01Q 1/48; H01Q 5/30; H01Q 21/28;
(Continued)

(56) References Cited

U.S. PATENT DOCUMENTS

| 7,106,252 B2 | 9/2006 | Smith et al. |
| 9,972,891 B2 | 5/2018 | Vazquez et al. |

(Continued)

FOREIGN PATENT DOCUMENTS

| JP | 6570485 B2 | 9/2019 |
| KR | 10-2004-0088551 A | 10/2004 |

(Continued)

OTHER PUBLICATIONS

International Search Report dated Nov. 26, 2020; the International Search Report lists relevant references found by the International Searching Authority.

(Continued)

*Primary Examiner* — Eugene Yun
(74) *Attorney, Agent, or Firm* — Cha & Reiter, LLC

(57) ABSTRACT

An electronic device is provided that includes a display disposed to face a first direction, a back plate disposed to face a second direction opposite to the first direction, a support member disposed below the display and configured to be coupled with the display, a printed circuit board disposed between the support member and the back plate, and a first antenna and a second antenna disposed between the printed circuit board and the back plate and configured to emit signals in a radio frequency band, and the first antenna is electrically connected to a first ground region included in the printed circuit board, and the second antenna may be electrically connected to a second ground region included in the support member.

11 Claims, 9 Drawing Sheets

(51) Int. Cl.
*H01Q 1/24* (2006.01)
*H01Q 1/38* (2006.01)
*H01Q 1/48* (2006.01)
*H01Q 21/28* (2006.01)

(58) Field of Classification Search
CPC ... H01Q 1/52; H01Q 9/42; H01Q 1/50; H04B 1/401; H04B 7/0413
USPC ........................................................ 455/575.7
See application file for complete search history.

(56) References Cited

U.S. PATENT DOCUMENTS

| | | | |
|---|---|---|---|
| 10,623,028 B2 | 4/2020 | Kim et al. | |
| 10,623,029 B2 | 4/2020 | Seo et al. | |
| 2005/0239519 A1 | 10/2005 | Saitou et al. | |
| 2018/0166809 A1* | 6/2018 | Brogan | H01R 12/714 |
| 2019/0081615 A1* | 3/2019 | Edwards | H03J 5/00 |
| 2020/0106182 A1* | 4/2020 | Ravishankar | H01Q 1/523 |

FOREIGN PATENT DOCUMENTS

| | | |
|---|---|---|
| KR | 10-2005-0087492 A | 8/2005 |
| KR | 10-2009-0100758 A | 9/2009 |
| KR | 10-2014-0062857 A | 5/2014 |
| KR | 10-2015-0117161 A | 10/2015 |
| KR | 10-1620378 B1 | 5/2016 |
| KR | 10-2018-0092226 A | 8/2018 |
| KR | 10-2019-0018207 A | 2/2019 |

OTHER PUBLICATIONS

Korean Office Action dated Jul. 5, 2023.

* cited by examiner

STRUCTURE FOR REDUCING INTERFERENCE BETWEEN ANTENNAS AND ELECTRONIC DEVICE COMPRISING THE SAME

CROSS REFERENCE TO RELATED APPLICATIONS

This application is a National Phase Entry of PCT International Application No. PCT/KR2020/009965, which was filed on Jul. 29, 2020, and claims a priority to Korean Patent Application No. 10-2019-0111338, which was filed on Sep. 9, 2019, the contents of which are incorporated herein by reference.

TECHNICAL FIELD

Certain embodiments disclosed in the disclosure relate to a technique for reducing interference between antennas.

BACKGROUND ART

Electronic devices may include a plurality of antennas. For example, electronic devices may form beams using the plurality of antennas.

DISCLOSURE OF THE INVENTION

Technical Problem

Interference between antennas may occur when a plurality of antennas are arranged in an electronic device. For example, in a frequency band of less than 1 GHz with omni-directionality, interference between antennas occurs and thus reduces the total radiated power (TRP).

Certain embodiments disclosed in the disclosure may provide a structure for reducing interference between antennas and a method associated therewith.

Technical Solution

In certain embodiment, an electronic device comprises a display facing a first direction; a back plate facing a second direction substantially opposite to the first direction; a support member disposed below the display and configured to be coupled with the display; a printed circuit board disposed between the support member and the back plate; and a first antenna and a second antenna disposed between the printed circuit board and the back plate and configured to emit signals in a radio frequency band, wherein the first antenna is electrically connectable to a first ground region included in the printed circuit board, and wherein the second antenna is electrically connectable to a second ground region included in the support member.

In certain embodiments, an electronic device comprises a display facing a first direction; a back plate facing a second direction substantially opposite to the first direction; a support member disposed below the display and configured to be coupled with the display; a printed circuit board disposed between the support member and the back plate; and a first antenna and a second antenna disposed between the printed circuit board and the back plate and configured to emit signals in a radio frequency band, wherein the first antenna is electrically connectable to a first ground region included in the printed circuit board, and wherein the second antenna is electrically connectable to a second ground region included in the display.

Advantageous Effects

According to certain embodiments disclosed in the disclosure, interference between a plurality of antennas included in an electronic device may be reduced.

According to certain embodiments disclosed in the disclosure, interference between a plurality of antennas may be reduced while maintaining the performance of operating modes supported by the electronic device.

Additional advantages may be realized, either directly, or indirectly from the disclosure.

BRIEF DESCRIPTION OF THE DRAWINGS

With respect to the description of the drawings, the same or similar reference signs may be used for the same or similar elements.

MODE FOR CARRYING OUT THE INVENTION

Hereinafter, certain embodiments disclosed in the disclosure will be described with reference to the accompanying drawings. However, this is not intended to limit the present disclosure to the specific embodiments, and it is to be construed to include various modifications, equivalents, and/or alternatives of embodiments of the present disclosure.

Figure 1:
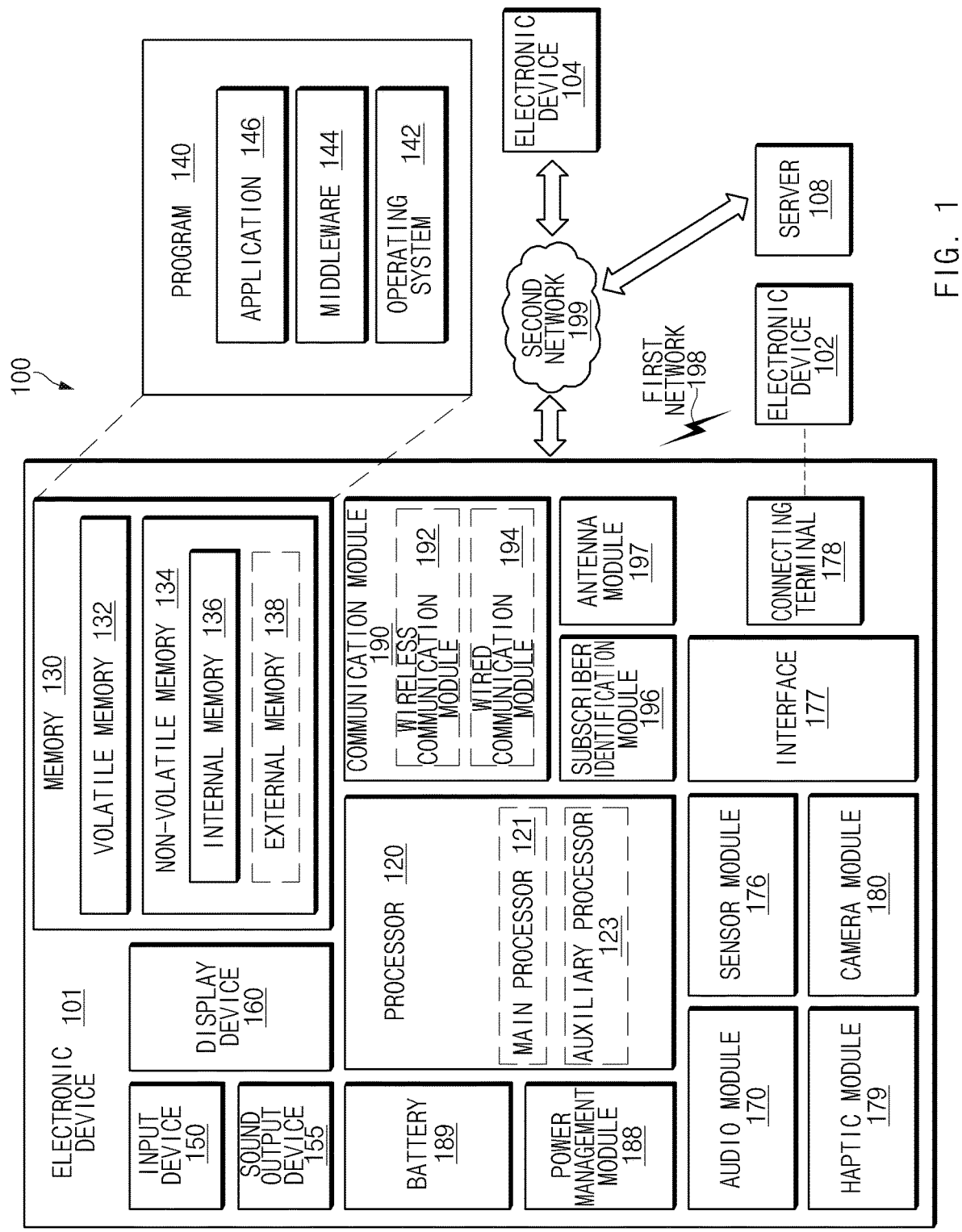
FIG. 1 is a block diagram illustrating an electronic device in a network environment according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module(SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device of FIG. 1 may include multiple antennas. For example, the wireless communication module 192 may include an antenna for accessing a cellular network, and another antenna for Bluetooth. Additionally, the electronic device 100 may include an array of antennas for forming a beam. In the case, where the electronic device is compact, such as a smartphone, the multiple antennas may be in close proximity to each other.

Figure 2:
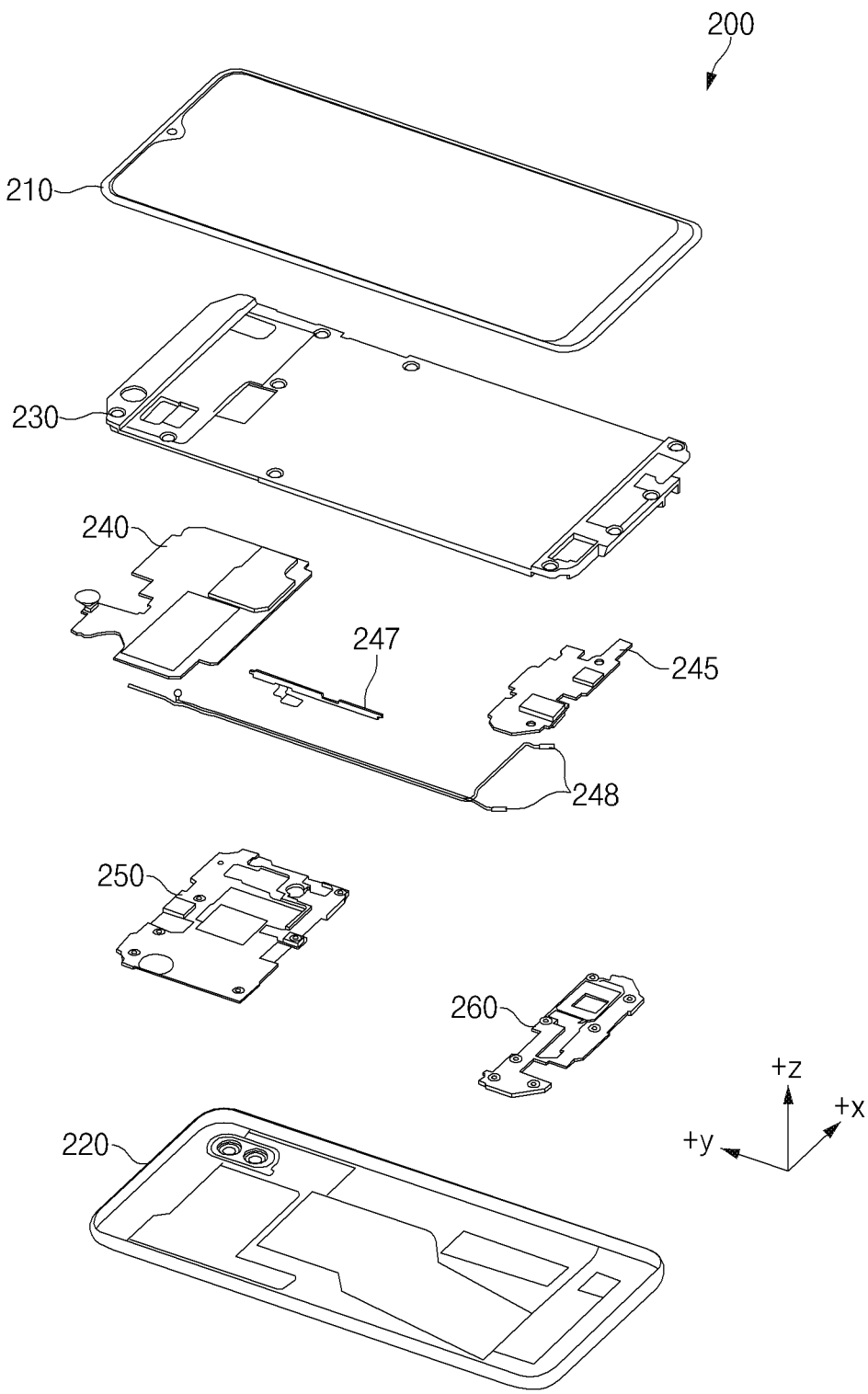
FIG. 2 is an exploded perspective view illustrating an electronic device according to certain embodiments.
Figure 3:
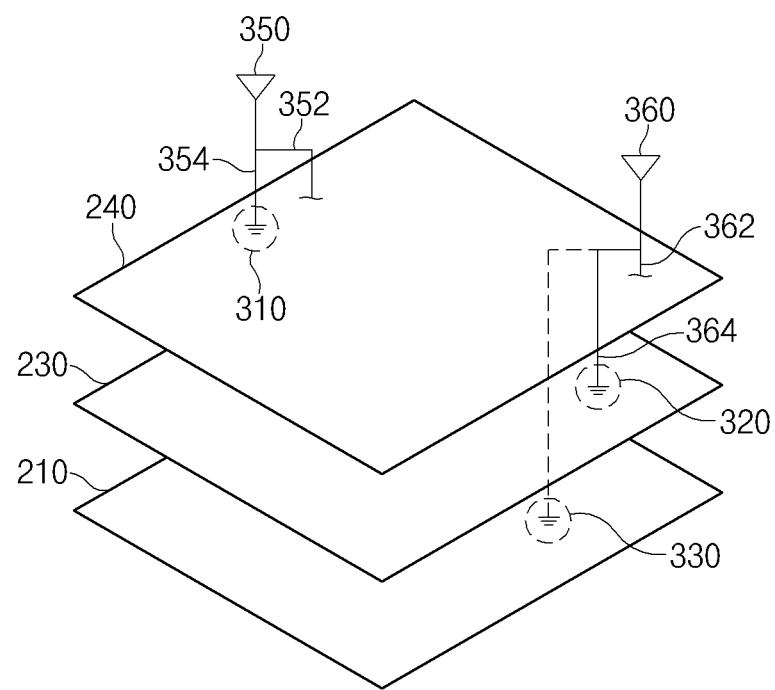
FIG. 3 illustrates a plurality of antennas connected to ground regions according to certain embodiments.

A structure for reducing interference between the multiple antennas will be shown below. FIG. 2 describes, among other things, a first antenna module 250, a second antenna module 260, a printed circuit board 240, a support member 230, and a display 210. FIG. 3 describes a first antenna 350 connected to a ground region of the printed circuit board 240 and a second antenna 360 connected to a ground region of the support member 230 or a ground region of the display 210.

Figure 4:
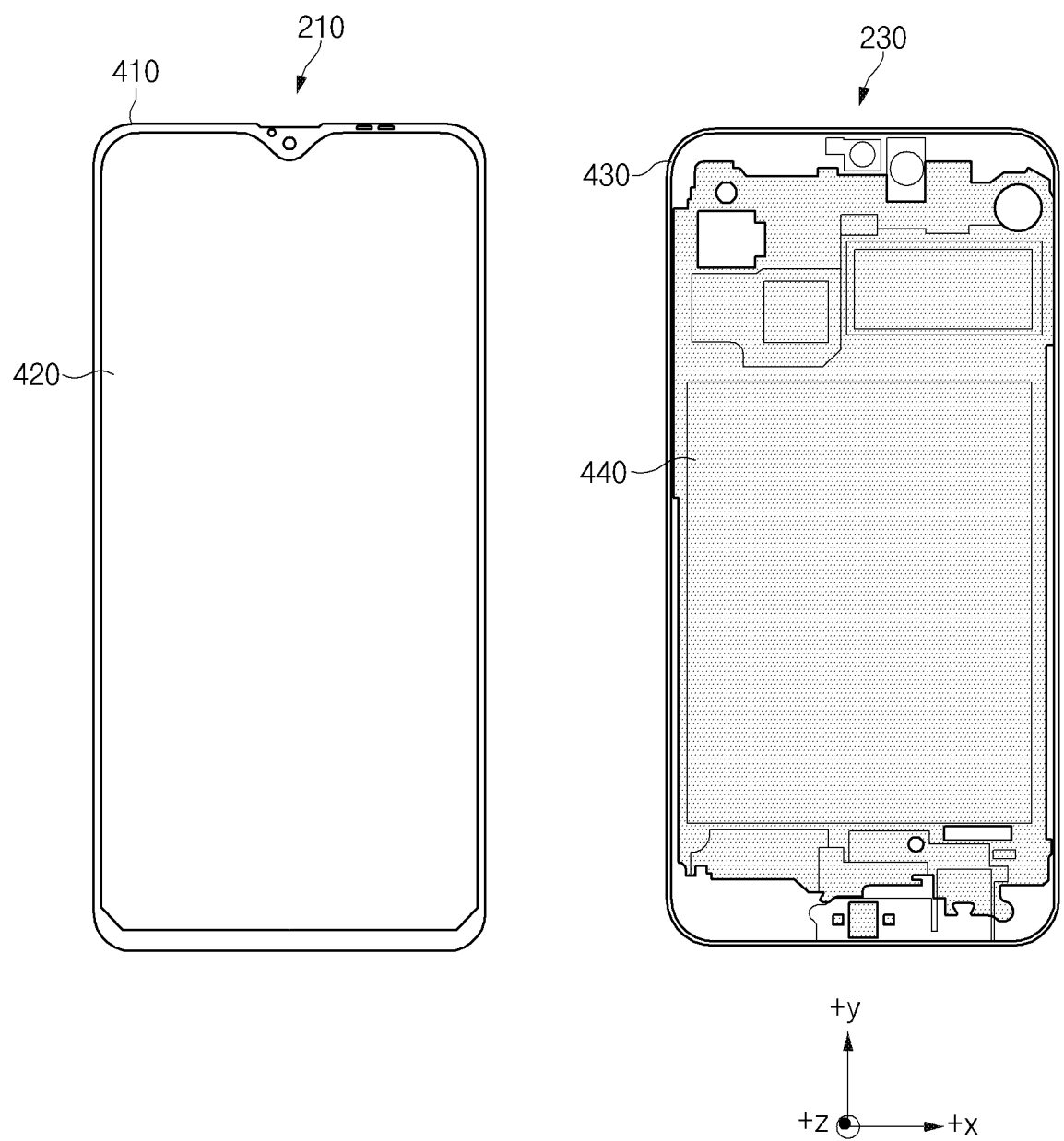
FIG. 4 illustrates a display and a support member according to certain embodiments.
Figure 5:
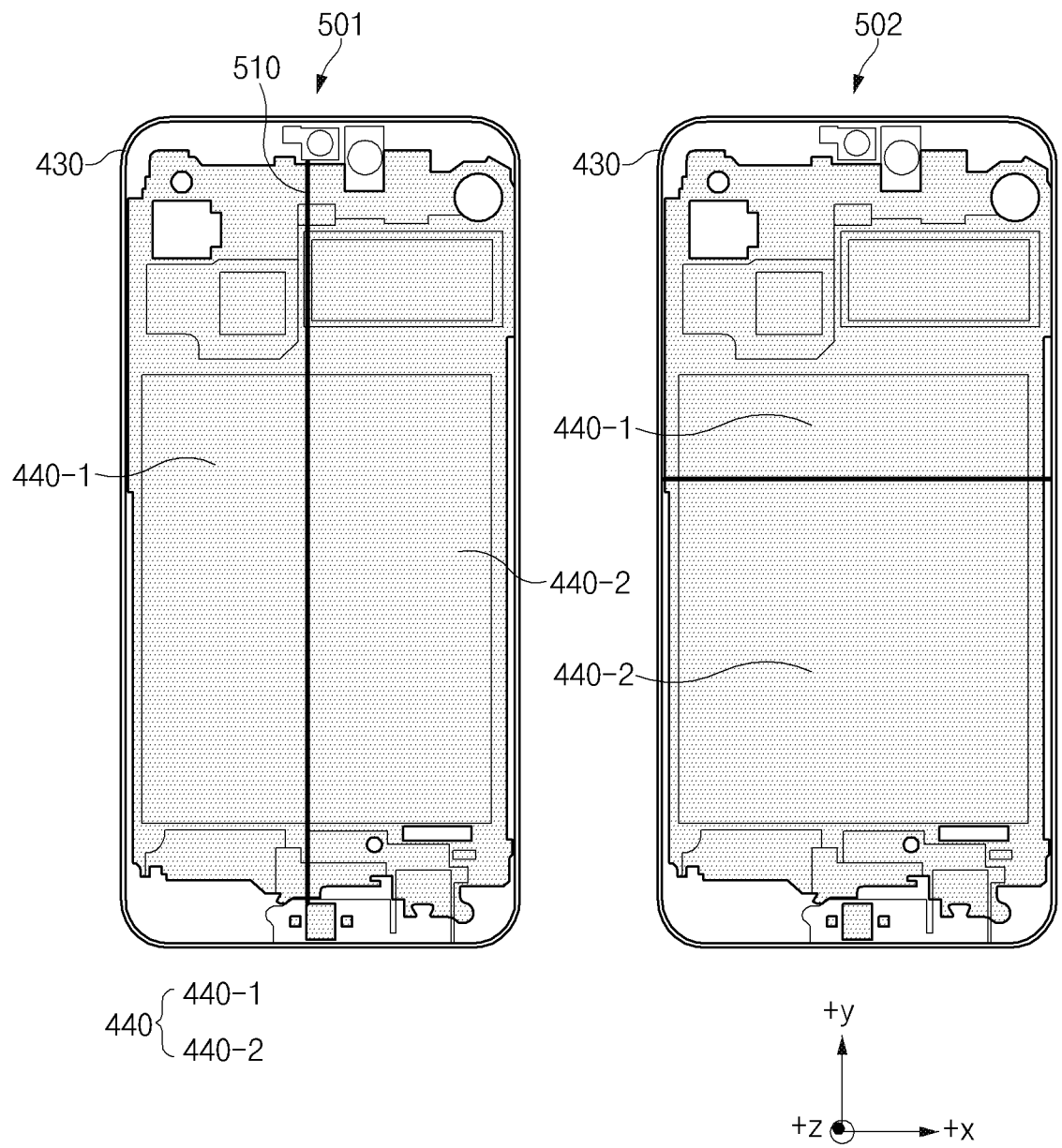
FIG. 5 illustrates an example of a support member including a plurality of ground regions.
Figure 6:
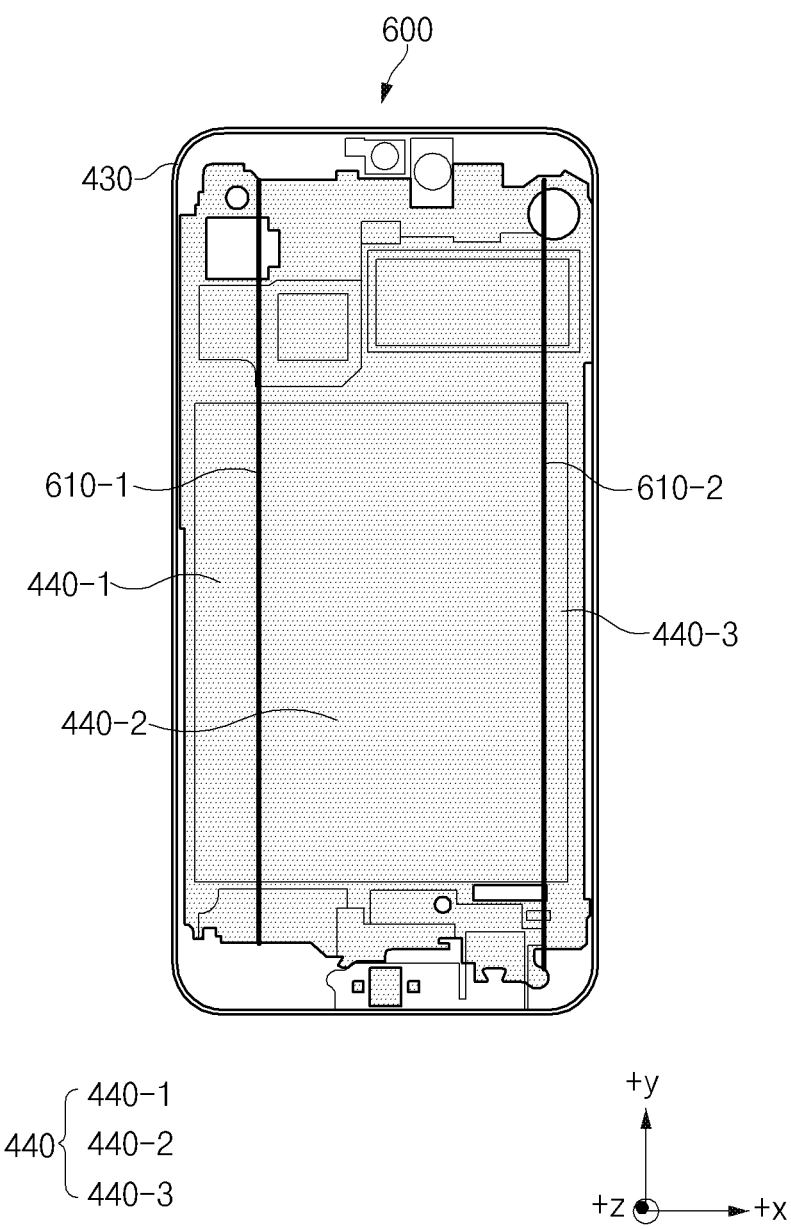
FIG. 6 illustrates another example of a support member including a plurality of ground regions.

For example, in the case where the ground region of the display 210 is used, FIG. 4, illustrates a display 210 including a glass region 410 and a metal region 420 and a support member 230 including a metal region 440 and a non-conductive region 430. The second antenna 360 can be connected to either the metal region 420 of the display 210 or the metal region 420 of the support member 230. FIGS. 5 and 6 describe the support structure in more detail.

Figure 7:
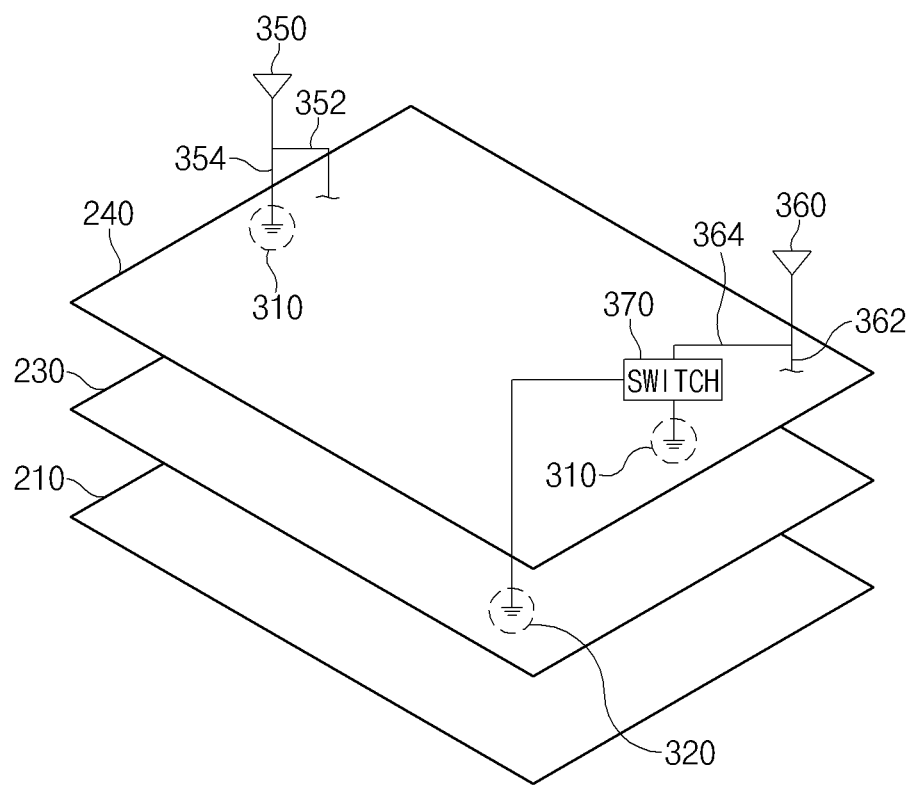
FIG. 7 illustrates an example of a plurality of antennas connected to a plurality of ground regions via switches.
Figure 8:
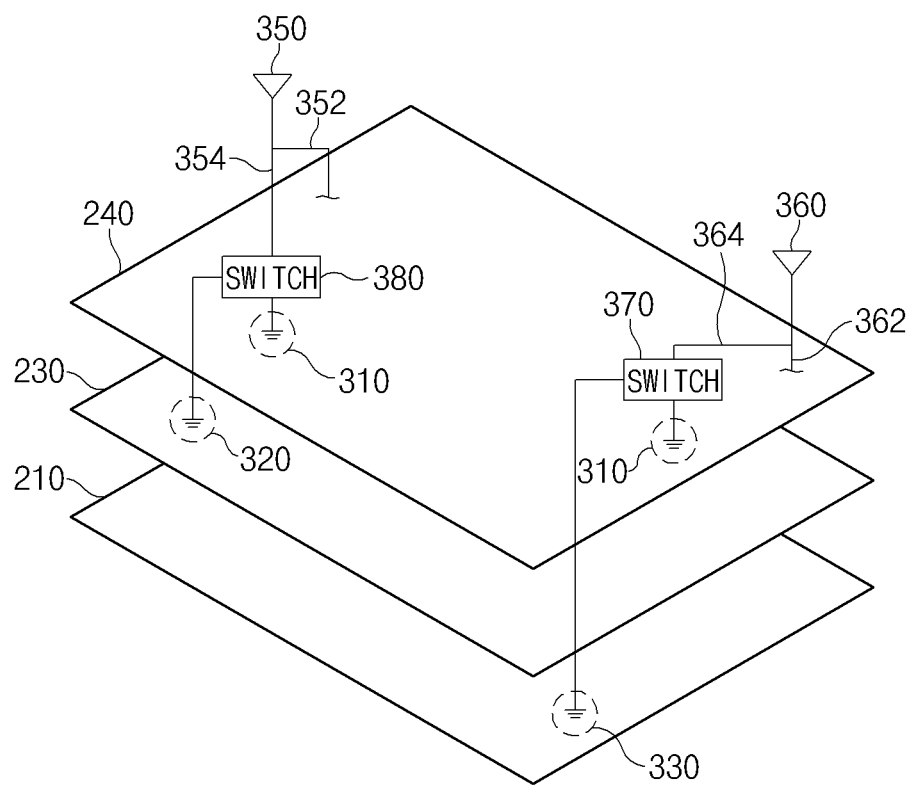
FIG. 8 illustrates another example of a plurality of antennas connected to a plurality of ground regions via switches.
Figure 9:
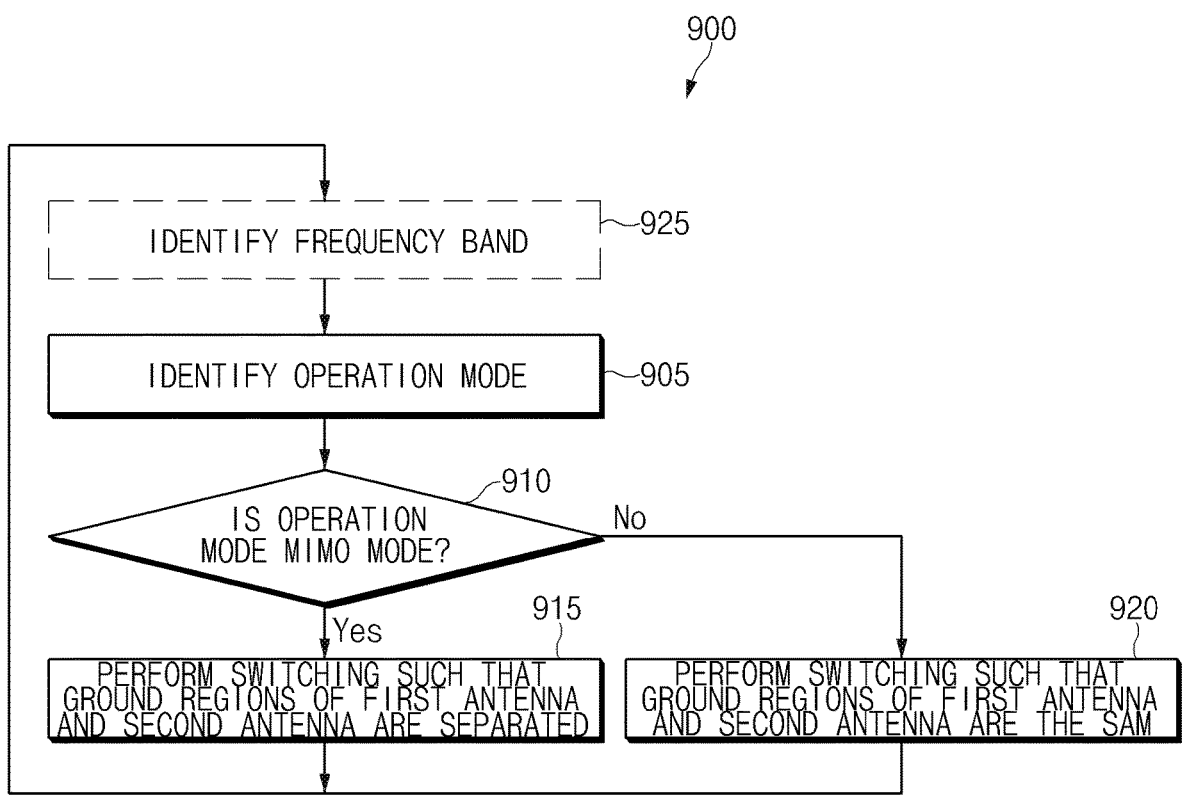
FIG. 9 is a flowchart illustrating operations of an electronic device that performs switching according to certain embodiments.

In certain embodiments, the first antenna 350 and the second antenna 360 can be electrically connectable to the same or different grounds via a switch as shown in FIGS. 7 and 8, based on the various operations. FIG. 9 is a flow chart describing the switching operations.

FIG. 2 is an exploded perspective view 200 of the electronic device 101 according to certain embodiments.

Referring to FIG. 2, the electronic device 101 may include a display 210 (e.g., at least a part of the display device 160 of FIG. 1), a back plate 220 (or back cover), a support member 230, a first printed circuit board (PCB) 240, a second printed circuit board 245, a first antenna module 250, and a second antenna module 260.

The first antenna module 250 may include an antenna and the second antenna module 260 may include another antenna. The antenna of the first antenna module 250 and the antenna of the second antenna module 260 may either receive the same symbols in the same frequency band to reduce Signal to Noise Ratio (SNR). Alternatively, the antennas can receive different symbols in the same band to increase throughput.

Interference between the antenna of the first antenna module 250 and the antenna of the second antenna module 260 is mitigated, if not eliminated by connection of the antennas to different ground regions. For example, the antenna of the first antenna module 250 can be connected to a ground region of the PCB 240, while the antenna of the second antenna module 260 can be connected to a ground region of the support member.

According to an embodiment, the display 210 may be disposed such that a surface on which a screen is output faces a first direction (e.g., +z-axis). Examples of the display 210 may include a liquid crystal display (LCD) or organic light emitting diode (OLED). The display 210 may include touch sensing circuitry, a pressure sensor capable of measuring the intensity (pressure) of the touch, a biometric sensor capable of recognizing biometric information on a user (e.g., fingerprint), and/or a digitizer detecting a magnetic field type stylus pen. The display 210 may be referred to as a display unit, a display module, or a display device.

According to an embodiment, the back plate 220 may be disposed below the display 210 (e.g., −z-axis direction).

According to an embodiment, the support member 230 may be formed of, for example, a metal material and/or a non-metal (e.g., polymer) material. The support member 230 may be referred to as a bracket. The support member 230 may be disposed between the display 210 and the back plate 220. For example, one surface of the support member 230 facing the first direction (e.g., +z-axis) may be coupled with the display 210, and the other surface of the support member 230 facing the second direction (e.g., −z-axis) may be coupled with the first printed circuit board 240 and the second printed circuit board 245.

According to an embodiment, the first printed circuit board 240 may be referred to as a main PCB. The first printed circuit board 240 may include components capable of executing various functions of the electronic device 101. Examples of the first printed circuit board 240 may include the components illustrated in FIG. 1 (e.g., the processor 120, the memory 130, the wireless communication module 192, and/or the interface 177).

According to an embodiment, the second printed circuit board 245 may be referred to as a sub PCB. The second printed circuit board 245 may be mounted at a different height from the first printed circuit board 240 based on the z-axis direction. For example, the second printed circuit board 245 is disposed at a higher position than the first printed circuit board 240 from the back plate 220 in the z-axis direction, and may be further spaced apart from an antenna pattern included in the second antenna module 260 than the first printed circuit board 240 in the z-axis direction. According to another embodiment, the electronic device 101 may not include the second printed circuit board 245. The first printed circuit board 240 may be electrically connected to the second printed circuit board 245 via a flexible PCB (FPCB) 247 and a coaxial cable 248.

According to an embodiment, the first antenna module 250 and the second antenna module 260 may perform the same or similar functions as the antenna module 197 of FIG. 1. The first antenna module 250 and the second antenna module 260 may include antennas capable of emitting signals in a radio frequency band. The antennas may be electrically connected to a feeding part and the ground region.

The first antenna and the second antenna of the electronic device 101 according to certain embodiments may be electrically connected to different ground regions. For example, the first antenna and the second antenna may be electrically connected to two different ground regions, among the ground regions included in the first printed circuit board 240, the ground region included in the support member 230, and the ground region included in the display 210. Connecting the first antenna and the second antenna to two different ground regions may prevent interference between the antennas in a specific frequency band.

FIG. 3 illustrates a plurality of antennas 350 and 360 connected to grounds regions 310, 320, and 330 according to certain embodiments. In the embodiments described below, the meaning of "connected to/with" may mean physically or electrically connected. "Electrically connectable" means either electrically connected or capable of electrical connection by a switch, such as selectively connected.

Referring to FIG. 3, the electronic device 101 may emit signals in the same or different frequency bands via the first antenna 350 (e.g., a part of the first antenna module 250 in FIG. 2) and the second antenna 360 (e.g., a part of the second antenna module 260 in FIG. 2). For example, if the electronic device 101 receives the same data (or the same symbol) using the first antenna 350 and the second antenna 360, the number of paths via which the data is transmitted increases, and thus the robustness of the channel and the received signal noise ratio (SNR) may increase (e.g., diversity). In addition, if the electronic device 101 simultaneously receives a plurality of different items of data (or symbols) using the first antenna 350 and the second antenna 360, data throughput may increase (e.g., MIMO or spatial multiplexing).

According to an embodiment, the first antenna 350 and the second antenna 360 may be a planar inverted F antenna (PIFA). For example, a first portion 352 of the first antenna 350 and a first portion 362 of the second antenna 360 are connected to feeding parts (not illustrated) of the first printed circuit board 240 and the second printed circuit board 245, respectively, and a second portion 354 of the first antenna 350 and a second portion 364 of the second antenna 360 may be connected to ground regions, respectively.

According to an embodiment, the first antenna 350 and the second antenna 360 may be connected to different ground regions. For example, the first antenna 350 (or the second portion 354) may be connected to the ground region 310—included in the first printed circuit board 240. The second antenna 360 (or the second portion 364) may be connected to the ground region 320—included in the support member 230. Since a beam pattern may be changed if the first antenna 350 and the second antenna 360 are connected to different grounds, an envelope correlation coefficient (ECC) between antennas may be improved.

FIG. 3 illustrates an embodiment in which the first antenna 350 is connected to the ground region 310 of the printed circuit board 240 and the second antenna 360 is connected to the ground region 320 of the support member 230, but according to other embodiments, the first antenna 350 may be connected to the ground region 310 of the printed circuit board 240 and the second antenna 360 may be connected to the ground region 330 included in the display 210.

In certain embodiments, the second antenna 360 can be connected to metal regions of the display 210 or support member 230.

FIG. 4 illustrates the display 210 and the support member 230 according to certain embodiments.

Referring to FIG. 4, the display 210 may include a glass region 410 and a metal region 420. At least a part of the metal region 420 may be used as the third ground region 330 of the display 210 of FIG. 3.

According to an embodiment, the support member 230 may include a non-conductive region 430 and a metal region 440. The non-conductive region 430 may be, for example, an injection region of a polymer material. The metal region 440 may be used as the ground region 320 of the support member 230 of FIG. 3.

According to an embodiment, the metal region 420 of the display 210 and the metal region 440 of the support member 230 may be electrically separated or insulated from each other. For example, an insulating material such as coating or tape may be disposed between the metal region 420 of the display 210 and the metal region 440 of the support member 230.

In certain embodiments, the first antenna 350 and the second antenna 360 can be connected to different metal regions of the support member 230 that are electrically separated or insulated from each other.

FIGS. 5 and 6 illustrate the support member 230 including a plurality of ground regions according to certain embodiments.

Referring to FIG. 5, the metal region 440 of the support member (e.g., 230 of FIG. 4) may be separated into a first metal region 440-1 and a second metal region 440-2 through an insulating material 510. For example, the metal region 440 may be separated in the right-left direction (e.g., the x-axis direction) as illustrated by the reference numeral 501, or may be separated in the up-down direction (e.g., the y-axis direction) as illustrated by the reference numeral 502.

The first metal region 440-1 and the second metal region 440-2 may each be used as electrically separated ground regions. The first metal region 440-1 and the second metal region 440-2 can be different ground regions.

According to embodiments, the first antenna 350 may be connected to the first metal region 440-1, and the second antenna 360 may be connected to the second metal region 440-2. According to another embodiment, the first antenna 350 may be connected to the ground region 310 of the printed circuit board 240 of the PCB 240 or the ground region 330 of the display, and the second antenna 360 may be connected to the first metal region 440-1 or the second metal region 440-2.

FIGS. 3 to 5 illustrate an embodiment in which two different antennas 350 and 360 are connected to different ground regions, but the number of antennas included in the electronic device 101 and used for diversity operation or MIMO operation may be three or more. In this case, the metal region 440 of the support member 230 may be separated into three or more. For example, referring to the reference number 600 of FIG. 6, the metal region 440 may be separated into the first metal region 440-1, the second metal region 440-2, and the third metal region 440-3 through a insulating material 610-1 and a insulating material 610-2. FIG. 6 illustrates the embodiment in which the metal regions 440 are separated in the right-left direction (e.g., the x-axis direction), but the metal region 440 may be separated in the up-down direction (e.g., the y-axis direction) by the same principle.

FIGS. 7 and 8 illustrate a plurality of antennas 350 and 360 connected to a plurality of ground regions 310, 320, and 330 via switches according to certain embodiments.

Referring to FIG. 7, the second antenna 360 may be selectively connected to a plurality of ground regions via a switch. For example, the second portion 364 of the second antenna 360 may be connected to a first switch 370, and the first switch 370 may be selectively connected to the ground region 310 of the printed circuit board 240 and the ground region 320 of the support member 230. If the second antenna 360 is connected to the ground region 310 of the printed circuit board 240 via the first switch 370, the second antenna 360 is connected to the same ground region as the first antenna 350, and thus the antenna gain may increase. On the other hand, if the second antenna 360 is connected to the ground region 320 of the support member 230 via the first switch 370, the ground regions of the second antenna 360 and the first antenna 350 are electrically separated, and thus the ECC may be improved. The electronic device 101 according to certain embodiments may control the first switch such that the second antenna 360 is connected to the ground region 310 of the printed circuit board 240 when an operation (e.g., diversity) in which antenna gain is preferentially required is used, and the second antenna 360 is connected to the second ground region 320 of the support member 230 when an operation (e.g., MIMO operation) requiring improvement of the ECC is used.

FIG. 7 illustrates an embodiment in which the second antenna 360 is connected to the ground region 310 of the printed circuit board 240 or the ground region 320 of the support member 230; however, according to another embodiment, the second antenna 360 may be selectively connected to the ground region 310 of the printed circuit board 240 and the ground region 330 of the display 210 via the first switch 370.

FIG. 7 illustrates an embodiment in which the first antenna 350 and the second antenna 360 may be commonly connected to the ground region 310 of the printed circuit board 240, but the first antenna 350 and the second antenna 360 may be commonly connected to the ground region 320 of the support member 230 or the ground region 330 of the display 210.

Referring to FIG. 8, the first antenna 350 as well as the second antenna 360 may be selectively connected to a plurality of ground regions via a second switch 380. In this case, a part of the second switch 380 may be connected to the ground region 310 of the printed circuit board 240 and another part may be connected to a ground region different from the ground region to which the second antenna 360 is connected. For example, the first antenna 350 may be electrically connectable to the ground region 310 of the printed circuit board 240 and the ground region 320 of the support member 230 via the second switch 380, and the second antenna 360 may be electrically connectable to the ground region 310 of the printed circuit board 240 and the ground region 330 of the display 210 via the first switch 370. For another example, the first antenna 350 may be electrically connectable to the ground region 310 of the printed circuit board 240 and the ground region 320 of the support member 230 via the second switch 380, and the second antenna 360 may be electrically connectable to the second ground region 320 of the support member 230 and the ground region 330 of the display 210 via the first switch 370. For yet another example, the first antenna 350 may be electrically connectable to the ground region 310 of the printed circuit board 240 and the ground region 330 of the display 210 via the second switch 380, and the second antenna 360 may be electrically connectable to the ground region 320 of the support member 230 and the ground region 330 of the display 210 via the first switch 370.

FIG. 9 is a flowchart 900 of operations of the electronic device 101 that performs switching according to certain embodiments.

The operations illustrated in FIG. 9 may be performed by the electronic device 101 or may be performed by components included in the electronic device 101. For example, a wireless communication circuit included in the first printed circuit board 240 and configured to perform wireless communication may perform the operations of FIG. 9. The wireless communication circuit may be, for example, at least a part of the wireless communication module 192 of FIG. 1 or a communication processor (CP).

Referring to FIG. 9, in operation 905, the electronic device 101 may identify an operation mode of the electronic device 101. Examples of the operation mode may include a diversity mode or a MIMO mode. In operation 910, the electronic device 101 may identify whether or not the identified operation mode is a MIMO mode.

If the operation mode is the MIMO mode, in operation 915, the wireless communication circuit may perform switching such that ground regions of the first antenna (e.g., the first antenna 350 of FIG. 3) and the second antenna (e.g., the second antenna 360 of FIG. 3) are separated. For example, if the first antenna and the second antenna are electrically connected to the first ground region (e.g., the ground region 310 of the printed circuit board 240 of FIG. 3), the wireless communication circuit may control the switch (the first switch 370 of FIG. 7) of the second antenna such that the second antenna 360 is disconnected from the ground region 310 and electrically connected to the second ground region (e.g., the ground region 320 of the support member 230 of FIG. 3) or the third ground region (e.g., the third ground region 330 of the display 210 of FIG. 3) which is electrically separated from the first ground region. For another example, if the first antenna and the second antenna are electrically connectable to different ground regions, the wireless communication circuit may not control the switch of the second antenna.

If the operation mode is not a MIMO mode, in operation 920, the wireless communication circuit may perform switching such that the ground regions electrically connected to the first antenna and the second antenna are the same. For example, if the first antenna is electrically connected to the first ground region and the second antenna is electrically connected to the second ground region or the third ground region, the wireless communication circuit may control the switch of the second antenna such that the second antenna is electrically connected to the first ground region and disconnected from the second ground region/third ground region. For another example, if the first antenna and the second antenna are electrically connected to the first ground region, the wireless communication circuit might not control the switch of the second antenna. For another example, if the first antenna is electrically connected to the second ground region and the second antenna is separated from the third ground region, the wireless communication circuit may control both the switch (e.g., the second switch 380 of FIG. 8) of the first antenna and the switch of the second antenna such that the first antenna and the second antenna are electrically connected to the first ground region.

FIG. 9 illustrates an embodiment in which the first antenna and the second antenna are electrically connected to the same ground region or different ground regions according to the operation mode; however, according to another embodiment, the wireless communication circuit may switch the first antenna and the second antenna based on information (e.g., a lookup table) stored in the memory (e.g., the memory 130 of FIG. 1) of the electronic device 101. For example, the wireless communication circuit may identify the ECC between antennas, corresponding to the frequency bands, which are being communicated, with the look-up table, and, if the ECC is equal to or greater than a specified threshold, may perform switching such that the ground regions of the first antenna and the second antenna are separated. If the ECC is less than the specified threshold, the wireless communication circuit may perform switching such that the ground regions of the first antenna and the second antenna are the same.

According to an embodiment, the wireless communication circuit may further perform operation 925 before performing operation 905. In operation 925, the wireless communication circuit may identify a frequency band being used. If the frequency band is within a specified range based on a specified frequency band (e.g., 1 GHz), the wireless communication circuit may perform operation 905. If the frequency band is out of the specified range based on the specified frequency band, the wireless communication circuit may end the algorithm without performing operation 905.

As described above, an electronic device (e.g., the electronic device 101 of FIG. 1) according to certain embodiments may include a display (e.g., the display 210 of FIG. 2) facing a first direction, a back plate (e.g., the back plate 220 of FIG. 2) facing a second direction substantially opposite to the first direction, a support member (e.g., the support member 230 of FIG. 2) disposed below the display and configured to be coupled with the display, a printed circuit board (e.g., the printed circuit board 245 in FIG. 2) disposed between the support member and the back plate, and a first antenna (e.g., the first antenna 350 in FIG. 3) and a second antenna (e.g., the second antenna 360 in FIG. 3) disposed between the printed circuit board and the back plate and configured to emit signals in a radio frequency band. The first antenna may be electrically connectable to a first ground region (e.g., the first ground region 310 of the printed circuit board 240 of FIG. 3) included in the printed circuit board and the second antenna may be electrically connectable to a second ground region (e.g., the second ground region 320 of the support member 230 of FIG. 3) included in the support member.

According to an embodiment, the first antenna and the second antenna may have a shape of a planar inverted F antenna (PIFA).

According to an embodiment, the electronic device may further include a first switch electrically connected to the second antenna, and the first switch (e.g., the first switch 370 of FIG. 7) may be electrically connected to the second ground region and the first ground region.

According to an embodiment, the electronic device may further include a second switch (e.g., the second switch 380 of FIG. 8) electrically connected to the first antenna, and the second switch may be electrically connected to the first ground region and a third ground region (e.g., the ground region 330 of the display 210 of FIG. 3) included in the display.

According to an embodiment, the electronic device may further include a processor (e.g., the processor 120 of FIG. 1) operatively connected to the first switch and the second switch, and the processor may be configured to identify an operation mode of the electronic device, to control the first switch and the second switch such that the first antenna and the second antenna are electrically connected to different ground regions if the operation mode is a multi-input multi-output (MIMO) mode, and to control the first switch and the second switch such that the first antenna and the second antenna are electrically connected to the first ground region if the operation mode is a diversity mode.

According to an embodiment, the processor may be configured to identify a frequency band being used by the electronic device, and to identify the operation mode of the electronic device if the frequency band is within a specified frequency range.

According to an embodiment, the specified frequency range may include a frequency band of 1 gigahertz (GHz).

According to an embodiment, the second ground region may include a metal region (e.g., the first metal region 440-1 of FIG. 5) and a metal region (e.g., the second metal region 440-2 of FIG. 5), which are electrically separated.

According to an embodiment, the support member may further include an insulating material provided to electrically separate the metal region and the metal region.

According to an embodiment, the display may include a liquid crystal display (LCD) and the support member may include a bracket.

As described above, an electronic device (e.g., the electronic device 101 of FIG. 1) according to certain embodiments may include a display (e.g., the display 210 of FIG. 2) facing a first direction, a back plate (e.g., the back plate 220 of FIG. 2) facing a second direction substantially opposite to the first direction, a support member (e.g., the support member 230 of FIG. 2) disposed below the display and configured to be couplable with the display, a printed circuit board (e.g., the printed circuit board 245 in FIG. 2) disposed between the support member and the back plate, a first antenna (e.g., the first antenna 350 in FIG. 3) and a second antenna (e.g., the second antenna 360 in FIG. 3) disposed between the printed circuit board and the back plate and configured to emit signals in a radio frequency band, and the first antenna may be electrically connectable—to a first ground region (e.g., the first ground region 310 of the printed circuit board 240 of FIG. 3) included in the printed circuit board and the second antenna may be electrically connectable to a second ground region (e.g., the third ground region 330 of the display 210 of FIG. 3) included in the display.

According to an embodiment, the first antenna and the second antenna may have a shape of a PIFA.

According to an embodiment, the electronic device may further include a first switch (e.g., the first switch 370 of FIG. 7) electrically connected to the second antenna, and the first switch may be electrically connected to the second ground region and the first ground region.

According to an embodiment, the electronic device may further include a second switch (e.g., the second switch 380 of FIG. 8) electrically connected to the first antenna, and the second switch may be electrically connected to a third ground region (e.g., the second ground region 320 of the support member 230 of FIG. 3) included in the support member.

According to an embodiment, the electronic device may further include a processor (e.g., the processor 120 of FIG. 1) operatively connected to the first switch and the second switch, and the processor may be configured to identify the operation mode of the electronic device and to control the first switch and the second switch such that the first antenna and the second antenna are electrically connected to different ground regions of the first ground region, the second ground region, and the third ground region if the operation mode is the MIMO mode, and to control the first switch and the second switch such that the first antenna and the second antenna are electrically connected to the first ground region if the operation mode is the diversity mode.

According to an embodiment, the processor may be configured to identify a frequency band being used by the electronic device, and to identify the operation mode of the electronic device if the frequency band is within a specified frequency range.

According to an embodiment, the specified frequency range may include a frequency band of 1 GHz.

According to an embodiment, the third ground region may include a metal region—(e.g., the first metal region 440-1 of FIG. 5) and a metal region (e.g., the second metal region 440-2 of FIG. 5), which are electrically separated.

According to an embodiment, the support member may further include an insulating material provided to electrically separate the first metal region 440-1 and the second metal region 440-2.

According to an embodiment, the display may include an LCD, and the support member may include a bracket.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to,"0 "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a display disposed to face a first direction;
a back plate disposed to face a second direction opposite to the first direction;
a support member disposed below the display and configured to be couplable with the display;
a printed circuit board disposed between the support member and the back plate;
a first antenna and a second antenna disposed between the printed circuit board and the back plate and configured to emit signals in a radio frequency band;
a first switch electrically connected to the second antenna; and
a second switch electrically connected to the first antenna;
wherein the first antenna is electrically connected to a first ground region included in the printed circuit board,
the second antenna is electrically connected to a second ground region included in the support member,
the first switch is electrically connected to the second ground region and the first ground region, and
the second switch is electrically connected to the first ground region and a third ground region included in the display.

2. The electronic device of claim 1, wherein the first antenna and the second antenna have a shape of a planar inverted F antenna (PIFA).

3. The electronic device of claim 1, further comprising a processor operatively connected to the first switch and the second switch,
wherein the processor is configured to:
identify an operation mode of the electronic device;
if the operation mode is a multi-input multi-output (MIMO) mode, control the first switch and the second switch such that the first antenna and the second antenna are connected to different ground regions; and
if the operation mode is a diversity mode, control the first switch and the second switch such that the first antenna and the second antenna are connected to the first ground region.

4. The electronic device of claim 3, wherein the processor is configured to:
identify a frequency band being used by the electronic device; and
if the frequency band is within a specified frequency range, identify the operation mode of the electronic device.

5. The electronic device of claim 4, wherein the specified frequency range includes a frequency band of 1 gigahertz (GHz).

6. The electronic device of claim 1, wherein the second ground region includes a fourth ground region and a fifth ground region, which are electrically separated.

7. The electronic device of claim 6, wherein the support member further includes an insulating material configured to electrically separate the fourth ground region and the fifth ground region.

8. The electronic device of claim 7,
wherein the display includes a liquid crystal display (LCD), and
wherein the support member includes a bracket.

9. An electronic device comprising:
a display disposed to face a first direction;
a back plate disposed to face a second direction opposite to the first direction;
a support member disposed below the display and configured to be couplable with the display;
a printed circuit board disposed between the support member and the back plate;
a first antenna and a second antenna disposed between the printed circuit board and the back plate and configured to emit signals in a radio frequency band;
a first switch electrically connected to the second antenna; and
a second switch electrically connected to the first antenna;
wherein the first antenna is electrically connected to a first ground region included in the printed circuit board,
the second antenna is electrically connected to a second ground region included in the display,
the first switch is electrically connected to the second ground region and the first ground region, and
the second switch is electrically connected to the first ground region and a third ground region included in the display.

10. The electronic device of claim 9, wherein the first antenna and the second antenna have a shape of a PIFA.

11. The electronic device of claim 9, further comprising a processor operatively connected to the first switch and the second switch, wherein the processor is configured to:
   identify an operation mode of the electronic device;
   if the operation mode is a MIMO mode, control the first switch and the second switch such that the first antenna and the second antenna are connected to different ground regions; and
   if the operation mode is a diversity mode, control the first switch and the second switch such that the first antenna and the second antenna are connected to the first ground region.

* * * * *